United States Patent
Peterseim et al.

(10) Patent No.: US 9,752,235 B2
(45) Date of Patent: Sep. 5, 2017

(54) WORKPIECE COMPRISING A LAMINATE TO PROTECT AGAINST AN IMPACT STRESS

(75) Inventors: Juergen Peterseim, Steinfurt (DE); Denis Knust, Schwerin (DE); Gerald Beermann, Coesfeld (DE)

(73) Assignee: FACHHOCHSCHULE MUENSTER, Muenster (DE)

( * ) Notice: Subject to any disclaimer, the term of this patent is extended or adjusted under 35 U.S.C. 154(b) by 0 days.

(21) Appl. No.: 14/235,454

(22) PCT Filed: Jul. 26, 2012

(86) PCT No.: PCT/EP2012/064701
§ 371 (c)(1),
(2), (4) Date: Jun. 24, 2014

(87) PCT Pub. No.: WO2013/017523
PCT Pub. Date: Feb. 7, 2013

(65) Prior Publication Data
US 2014/0291326 A1  Oct. 2, 2014

(30) Foreign Application Priority Data

Jul. 29, 2011 (DE) .......................... 10 2011 108 808
Aug. 18, 2011 (DE) .......................... 10 2011 110 633

(51) Int. Cl.
| | | |
|---|---|---|
| *C23D 5/02* | (2006.01) | |
| *C23D 7/00* | (2006.01) | |
| *B65D 51/00* | (2006.01) | |
| *B32B 15/01* | (2006.01) | |
| *B32B 15/04* | (2006.01) | |
| *B32B 15/18* | (2006.01) | |
| *C22C 19/00* | (2006.01) | |
| *C22C 19/05* | (2006.01) | |
| *C22C 38/18* | (2006.01) | |
| *B23K 35/30* | (2006.01) | |
| *B23K 35/02* | (2006.01) | |
| *B22F 7/04* | (2006.01) | |
| *C22C 19/03* | (2006.01) | |
| *C22C 1/04* | (2006.01) | |
| *B22F 1/00* | (2006.01) | |

(52) U.S. Cl.
CPC .................. *C23D 7/00* (2013.01); *B22F 7/04* (2013.01); *B23K 35/025* (2013.01); *B23K 35/304* (2013.01); *B23K 35/3053* (2013.01); *B32B 15/01* (2013.01); *B32B 15/011* (2013.01); *B32B 15/012* (2013.01); *B32B 15/015* (2013.01); *B32B 15/04* (2013.01); *B32B 15/043* (2013.01); *B32B 15/18* (2013.01); *B65D 51/00* (2013.01); *C22C 1/0433* (2013.01); *C22C 19/00* (2013.01); *C22C 19/03* (2013.01); *C22C 19/05* (2013.01); *C22C 38/18* (2013.01); *C23D 5/02* (2013.01); *B22F 1/0074* (2013.01); *B22F 2007/047* (2013.01); *Y10T 428/12* (2015.01); *Y10T 428/12014* (2015.01); *Y10T 428/12028* (2015.01); *Y10T 428/1266* (2015.01); *Y10T 428/12847* (2015.01); *Y10T 428/12854* (2015.01); *Y10T 428/12944* (2015.01); *Y10T 428/12965* (2015.01); *Y10T 428/12972* (2015.01); *Y10T 428/12979* (2015.01)

(58) Field of Classification Search
CPC ......... C22C 19/00; C22C 19/03; C22C 19/05; C22C 38/18; C22C 1/0433; B32B 15/015; B32B 15/011; B32B 15/01; B32B 15/012; B32B 15/04; B32B 15/043; B32B 15/18; Y10T 428/1266; Y10T 428/12; Y10T 428/12014; Y10T 428/12028; Y10T 428/12944; Y10T 428/12847; Y10T 428/12854; Y10T 428/12965; Y10T 428/12972; Y10T 428/12979; C23C 24/00; C23C 24/08; C23C 30/00; C23C 30/005

See application file for complete search history.

(56) References Cited

U.S. PATENT DOCUMENTS

| | | | |
|---|---|---|---|
| 2,833,638 A | 5/1958 | Owen | |
| 3,023,490 A | 3/1962 | Dawson | |
| 3,756,834 A * | 9/1973 | Short | ........................... 106/1.13 |
| 3,790,353 A | 2/1974 | Jackson et al. | |
| 3,844,019 A | 10/1974 | Shwayder et al. | |
| 4,013,453 A | 3/1977 | Patel | |
| 2003/0224201 A1 * | 12/2003 | Kawakami | .......... C23C 14/0015 428/672 |

(Continued)

FOREIGN PATENT DOCUMENTS

| | | |
|---|---|---|
| CA | 1 064 779 A1 | 10/1979 |
| DE | 23 53 514 A1 | 4/1975 |

(Continued)

OTHER PUBLICATIONS

Machine Translation, Peterseim, et al., WO 2006/119962, Nov. 2006.*
Machine Translation, Kasukawa, et al., JP 2007-119807, May 2007.*
Machine Translation, Peterseim, et al., DE 102006050985, Apr. 2008.*

(Continued)

*Primary Examiner* — Michael E La Villa
(74) *Attorney, Agent, or Firm* — Norman B. Thot

(57) ABSTRACT

A method for applying a protective layer to protect against an impact stress includes mixing a sealing alloy in a powder form with a binder and water to form a pasty compound, applying the pasty compound on a surface to be protected, drying the applied pasty compound, and heating the dried applied pasty compound to a temperature of at least 800° C.

4 Claims, No Drawings

(56) References Cited

U.S. PATENT DOCUMENTS

2009/0004434 A1    1/2009  Parent et al.
2009/0016923 A1*   1/2009  Treutler ............ B01D 39/2034
                                                            419/5

FOREIGN PATENT DOCUMENTS

| | | |
|---|---|---|
| DE | 25 09 190 A1 | 9/1975 |
| DE | 25 40 748 C2 | 4/1976 |
| DE | 26 22 893 A1 | 1/1977 |
| DE | 26 12 210 B1 | 9/1977 |
| DE | 84 00 902 U1 | 1/1985 |
| DE | 199 53 259 A1 | 5/2001 |
| DE | 199 56 197 A1 | 6/2001 |
| DE | 10 2005 022 264 A1 | 11/2006 |
| DE | 10 2006 050 985 A1 | 4/2008 |
| EP | 2 008 552 A1 | 12/2008 |
| GB | 1 482 044 A | 8/1977 |
| JP | 2007-119807 A * | 5/2007 |
| WO | WO 99/00534 A1 | 1/1999 |
| WO | WO 2006/119962 A2 * | 11/2006 |

OTHER PUBLICATIONS

J. Peterseim: "Hardpaint, novel coating technology to increase the wear resistance of machine and plant system", Fachhochschule Muenster, pp. 1-32 (Oct. 30, 2012).

RAL-RG 529 A2, „Definitions and labeling regulations enamel and enameled products, Deutsches Institut fuer Guetesicherung und Kennzeichnung e. V., pp. 1-6 (Jul. 2007).

* cited by examiner

WORKPIECE COMPRISING A LAMINATE TO PROTECT AGAINST AN IMPACT STRESS

CROSS REFERENCE TO PRIOR APPLICATIONS

This application is a U.S. National Phase application under 35 U.S.C. §371 of International Application No. PCT/EP2012/064701, filed on Jul. 26, 2012 and which claims benefit to German Patent Application No. 10 2011 108 808.7, filed on Jul. 29, 2011, and to German Patent Application No. 10 2011 110 633.6 filed on Aug. 18, 2011. The International Application was published in German on Feb. 7, 2013 as WO 2013/017523 A1 under PCT Article 21(2).

FIELD

The present invention relates to a method for applying a protective layer to protect against impact stresses, in particular, for increasing the impact strength of workpieces.

BACKGROUND

Numerous ways to protect objects against impact stresses, in particular, against high-energy, briefly acting impact stresses, have previously been described. The intention is to prevent penetration of the protective layer or of the workpiece by a striking item. In this case, the kinetic energy of the striking item must be absorbed and passed on as gently as possible to the workpiece or dissipated. It is not necessarily the hardness of the uppermost surface layers that is here important, it is, rather, decisive that the kinetic energy of the striking item is sufficiently dissipated at the latest when it reaches the lowermost regions of the protective layer or is transferred to the workpiece.

DE 199 53 259 C2 describes a composite of at least one protective sheet and a backing of metal plates or a fiber fabric. The protective sheet has a thickness of at least 10 mm, which already gives the arrangement a great weight. The weights of such protective sheets are generally regarded as being disadvantageous.

DE 199 56 197 C2 describes a reactive protection for the outer wall of an object to be protected. The protection has a number of layers, one layer of which consists of an explosive that detonates when hit by a projectile. The detonated explosive produces a counter-explosion with respect to the explosive charge of hollow-charge projectiles which is intended to disperse the kinetic energy of the hollow-charge projectile.

DE 10 2005 022 264 A1 describes an enamel coating for liquid application. This is intended, for example, for machine components that are exposed to particularly demanding tribological conditions and are therefore subjected to particularly great wear. The method described there is particularly suitable for producing a wear-resistant coating as a thick layer with a removal reserve. This method is not intended to be suitable for the use of thin layers. A use for improving impact strength is not described.

SUMMARY

An aspect of the present invention is to provide an improved method for applying a protective layer for protection against impact stress.

In an embodiment, the present invention provides a method for applying a protective layer to protect against an impact stress which includes mixing a sealing alloy in a powder form with a binder and water to form a pasty compound, applying the pasty compound on a surface to be protected, drying the applied pasty compound, and heating the dried applied pasty compound to a temperature of at least 800° C.

DETAILED DESCRIPTION

In an embodiment, the present invention provides a method for applying a protective layer for protection against impact stress comprising the following method steps: producing a protective layer, wherein a sealing alloy in powder form is mixed with a binder and with water to form a pasty compound. Suitable as the binder is an enamel, for example, up to a proportion by weight of 40%. An enamel is, for example, a fusion mixture of silicates, borates and fluorides with metals, for example, sodium, potassium, lead or aluminum. Details of the enamel are defined in RAL-RG, 529 A3. The pasty compound is then applied to a surface to be protected. The pasty compound is subsequently dried, for example, at room temperature or at a temperature up to a maximum of approximately 60° C. The water should thereby be removed to the greatest extent from the pasty compound so that, for example, less than 10% by weight of water remains in the pasty compound. The protective layer is subsequently heated to a high temperature, i.e., to at least 800° C., with temperatures of at least approximately 900° C., 950° C. or 1,000° C. being suitable. A temperature of over 1,300° C. is generally not required.

It has been found that, apart from tremendous hardness and wear resistance, such a layer can also provide the properties that are required for a protective layer for protecting against impact stress. The impact strength is in this case also decisively influenced by the stresses occurring within the protective layer, which contributes significantly to dissipating the kinetic energy of the penetrating item as effectively as possible. Hardness alone, which in the case of conventional protective layers is often achieved by ceramic inclusions, is generally not sufficient, especially since hard objects are often susceptible to the risk of brittle fracture formations and, in the fractured state, can only offer reduced resistance to a penetrating item. The present protective layer is also distinguished by a certain compliance or deformability under mechanical loading so that kinetic energy can be absorbed. The use of such a layer for the purposes of improving impact strength has not previously been described.

In an embodiment of the present invention, the sealing alloy can, for example, be formed from a chromium-containing nickel-based alloy. Further components may also be provided. Boron and/or silicon are suitable as further components. These components may be present up to a maximum proportion by weight of approximately 4%. Iron may furthermore be provided, for example, in a proportion by weight of approximately 1%. Tests have shown that the introduction of a proportion of iron into the chromium-containing nickel-based alloy can decisively improve the impact strength. The sealing alloy may alternatively be formed from an iron-based alloy. The use of further components is also possible. Chromium, boron, silicon and/or carbon may, for example, also be provided in the iron-based alloy. A maximum proportion of chromium of approximately 25% by weight can be used.

In an embodiment of the present invention, a layer of solid material, for example, a metal plate or steel plate, is applied to the sealing alloy. A further layer of the sealing alloy is applied to the layer of solid material. This is performed substantially in the same way as described above. A laminate comprising at least two layers of sealing alloy and at least one layer of solid material between the two layers of the sealing alloy is thereby obtained. Further layers may, however, still be applied alternately with a layer of solid material and a layer of sealing alloy. This allows a kind of composite material to be formed. The laminate, i.e., all of the layers of sealing alloy that are present in the laminate, can, for example, be dried together and treated in a heat treatment process, such as a single heat treatment process. This heat treatment process is the one described above and is performed in the temperature ranges mentioned of approximately between 800° C. and 1,300° C.

In an embodiment of the present invention, the protective layer can, for example, be applied exclusively on one side of a workpiece, i.e., the side of the workpiece that is exposed to the risk of possible impact. The protective layer can, for example, be provided exclusively on a surface of the workpiece on which no tribological effects occur during use as intended. In contrast with a wearing layer, the protective layer should not be gradually consumed by tribological effects, but should, for example, remain on the surface over the entire lifetime of the workpiece.

In an embodiment of the present invention, a metallic layer can, for example, be applied as a sealing alloy with a thickness in the range of less than 1 mm to several millimeters to a steel substrate with a thickness in the range of several millimeters. The layer consists of a chromium-containing nickel-based alloy, which may also contain proportions of boron and possibly silicon up to approximately 4% by weight. Iron may furthermore be provided up to 1% by weight. As an alternative to the chromium-containing nickel-based alloy, an iron-based alloy, for example, with chromium, boron, silicon and carbon, may also be used. The chromium content may be up to 25% by weight. The layer furthermore contains up to 40% by weight of an enamel.

The mentioned components of the sealing alloys are, for example, mixed in powder form with water to form a pasty compound and are applied to the steel substrate and smoothed out. The water contained is then removed by drying at room temperature or at a slightly elevated temperature of up to about 60° C. This is followed by heating in a vacuum or inert-gas furnace or by an induction device. The heating is performed in a temperature range in which the layer becomes viscous. The sealing alloy is then evenly distributed over the steel plate as a result of its rheological behavior and enters into a solid bond with the steel plate. The required temperature for this heat treatment process is alloy-dependent and lies, for example, between 1,000° C. and 1,300° C. The sealing alloy is applied to the side of the steel substrate that is exposed to possible impact.

The sealing alloy described may also be used in a multilayered composite structure. In this case, the sealing alloy alternates with layers of steel or layers of other solid material. Such a composite body is produced by alternating application of the sealing alloy and placement of a thin layer of solid material, for example, a steel plate, and repetition of this process a number of times. The laminate obtained is subsequently dried and finished by being treated in a single heat treatment process to form a solid laminate. The advantage of this arrangement is that one or more of the layers of solid material, which may consist of a hardenable steel, can absorb energy to an increased degree. The setting of the hardening state can take place without any additional effort by using an increased cooling rate from the heat treatment. It is possible here to use the chemical composition and the thickness of the individual layers of solid material to also set a desired graduated profile of properties of the overall system, which leads to a specifically intended energy absorption of the individual components of the layers. It is thus possible, for example, for one of the layers to have an increased hardness, while another layer may be provided with increased stress formation.

The protective layer described may convert the kinetic impact energy into heat, deformation and other reactions within the layer. Locally occurring heating may, for example, lead to a partial melting of the impacting body. Depending on the configuration, the risk of penetration can be reduced, particularly when compared with other protective layers of the same weight.

The protective layer of the present invention is distinguished by a very low weight, which may be 40 to 80% lower than conventional protective layers against impact stress. The protective layer can be easily produced and can be produced in various embodiments in conventional production facilities. The precise properties can be adapted to a respective application by the chemical composition and also by the structure of the layers.

The protective layer is suitable for use as a locking box for increasing the security thereof. A locking box may comprise a compartment for storing items. The locking box is secured against unauthorized opening by a locking device. Such a protective layer is also suitable for the lock body of a lock, for example, a shackle lock or the like, in which the locking mechanism or locking electrics may be accommodated.

The present invention is not limited to embodiments described herein; reference should be had to the appended claims.

What is claimed is:

1. A workpiece comprising a laminate to protect against an impact stress, the laminate being applied by a method comprising:
   mixing a sealing alloy in a powder form with a binder and water to form a pasty compound;
   applying a first coating of the pasty compound on a surface to be protected;
   applying a layer of a solid material to the first coating of the applied pasty compound;
   applying a second coating of the pasty compound on a surface of the layer of the solid material so as to form a laminate which comprises at least two layers of the pasty material and at least one layer of the solid material, the at least one layer of the solid material being arranged between the two layers of the pasty compound; and
   heating the laminate to a temperature of at least 800° C., wherein, the layer of the solid material is steel.

2. The workpiece as recited in claim 1, wherein the workpiece is a locking box or a lock body of a lock or components thereof.

3. A workpiece comprising a laminate to protect against an impact stress, the laminate being applied by a method comprising:
   mixing a sealing alloy in a powder form with a binder and water to form a pasty compound;
   applying a first coating of the pasty compound on a surface to be protected;
   applying a layer of a solid material to the first coating of the applied pasty compound;

applying a second coating of the pasty compound on a surface of the layer of the solid material so as to form a laminate which comprises at least two layers of the pasty material and at least one layer of the solid material, the at least one layer of the solid material being arranged between the two layers of the pasty compound; and heating the laminate to a temperature of at least 800° C., wherein, the pasty compound comprises,
- about 50 to <100 wt.-% of the sealing alloy, the sealing alloy being a chromium-containing nickel-based alloy comprising 0-4 wt.-% boron, 0-4 wt.-% silicon, and 0-1 wt.-% iron,
- >0 to 40 wt.-% of a binder, the binder being an enamel selected from a fusion mixture of silicates, borates and fluorides and a metal selected from at least one of sodium, potassium, lead and aluminum, and
- >0 to <10 wt.-% water,
- the wt.-%'s of the sealing alloy, the binder and the water adding up to 100 wt.-%, and the layer of the solid material is steel.

4. The workpiece as recited in claim 3, wherein the workpiece is a locking box or a lock body of a lock or components thereof.

\* \* \* \* \*